US009699057B2

(12) United States Patent
Janardhanan

(10) Patent No.: US 9,699,057 B2
(45) Date of Patent: Jul. 4, 2017

(54) SYSTEM AND METHOD FOR DIAGNOSTIC PACKET IDENTIFICATION

(71) Applicant: Dell Products, L.P., Round Rock, TX (US)

(72) Inventor: Pathangi Narasimhan Janardhanan, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 244 days.

(21) Appl. No.: 14/139,670

(22) Filed: Dec. 23, 2013

(65) Prior Publication Data

US 2015/0180758 A1    Jun. 25, 2015

(51) Int. Cl.
*H04L 12/26* (2006.01)
*H04L 29/06* (2006.01)

(52) U.S. Cl.
CPC .......... *H04L 43/10* (2013.01); *H04L 69/22* (2013.01); *H04L 43/0811* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 5,951,645 A * | 9/1999 | Goto | ............... | H04L 29/06 370/469 |
| 6,751,761 B1 * | 6/2004 | Tendo | ............... | H04L 43/50 370/249 |
| 8,111,625 B2 * | 2/2012 | Hof | ............... | H04L 12/2697 370/242 |
| 9,300,562 B2 * | 3/2016 | Dufour | ............... | H04L 43/10 |
| 9,313,132 B1 * | 4/2016 | Kugel | ............... | H04L 43/04 |
| 2002/0138648 A1 * | 9/2002 | Liu | ............... | H04L 29/12009 709/245 |
| 2009/0037713 A1 * | 2/2009 | Khalid | ............... | H04L 12/4633 713/1 |

(Continued)

OTHER PUBLICATIONS

Bob Briscoe, "Reusing the IPv4 Identification Field in Atomic Packets." Oct. 20, 2012 http://tools.ietf.org/html/draft-briscoe-intarea-ipv4-id-reuse-03, Aug. 27, 2013.

*Primary Examiner* — Candal Elpenord
*Assistant Examiner* — Juvena Loo
(74) *Attorney, Agent, or Firm* — Haynes & Boone, LLP

(57) ABSTRACT

A system and method for handling packets includes receiving the packets at a layer 3 handler in a network device, determining whether the packets are diagnostic packets by examining bit patterns of the packets, determining whether an application in the network device can handle the diagnostic packets when the packets are the diagnostic packets, delivering the diagnostic packets to the application for handling when the application in the network device can handle the diagnostic packets, receiving response packets from the application, and transmitting the response packets. In some embodiments, the bit patterns include a reserved bit of an IP header that is set to one when the packets are the diagnostic packets. In some embodiments, application packets and the diagnostic packets include a same source IP address, a same destination IP address, a same source port, and a same destination port.

20 Claims, 4 Drawing Sheets

(56) References Cited

U.S. PATENT DOCUMENTS

| | | | |
|---|---|---|---|
| 2009/0279440 A1* | 11/2009 | Wong | H04L 43/0823 370/242 |
| 2010/0177650 A1* | 7/2010 | Wittgreffe | H04J 3/14 370/252 |
| 2011/0055388 A1* | 3/2011 | Yumerefendi | G06F 11/3409 709/224 |
| 2012/0170575 A1* | 7/2012 | Mehra | H04L 41/00 370/359 |
| 2013/0010600 A1* | 1/2013 | Jocha | H04L 43/026 370/236.2 |
| 2014/0169179 A1* | 6/2014 | Ding | H04L 43/062 370/241.1 |
| 2014/0280834 A1* | 9/2014 | Medved | H04L 47/122 709/223 |
| 2015/0263892 A1* | 9/2015 | John | H04L 41/0806 370/236.2 |

* cited by examiner

__US 9,699,057 B2__

SYSTEM AND METHOD FOR DIAGNOSTIC PACKET IDENTIFICATION

BACKGROUND

The present disclosure relates generally to information handling systems, and more particularly to handling and identification of diagnostic packet.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network switch to a destination system or second network switch. Due to the size, complexity, and dynamic nature of these networks, sophisticated network switching products are often required to continuously make routing decisions and to update routing information as network configurations change. In many cases, some level of diagnostic ability is needed to check whether the application at the destination network switch is alive and receiving packets, or whether the intervening network switching products used along the path for routing the packets from the source application at a source device to the application at the destination device are functioning normally. Many network diagnostic systems utilize special diagnostic protocols and diagnostic packets that are often routed through the network using different paths than application packets to the same destination device. This complicates the ability of these network diagnostic systems to consistently evaluate and/or diagnose the handling of the application packets.

Accordingly, it would be desirable to provide a method and a system for handling diagnostic packets so that the diagnostic packets use the same networking paths as corresponding application packets.

SUMMARY

According to some embodiments, a method of handling packets includes receiving the packets at a layer 3 handler in a network device, determining whether the packets are diagnostic packets by examining bit patterns of the packets, determining, when the packets are the diagnostic packets, whether an application in the network device can handle the diagnostic packets, delivering the diagnostic packets, when the application in the network device can handle the diagnostic packets, to the application for handling, receiving response packets from the application, and transmitting the response packets.

According to some embodiments, a network device includes a memory storing an application and a layer 3 handler, and a processor coupled to the memory and configured to execute the application and the layer 3 handler. The layer 3 handler is configured to receive packets, determine whether the packets are diagnostic packets by examining bit patterns of the packets, determine, when the packets are the diagnostic packets, whether the application can handle the diagnostic packets, deliver the diagnostic packets, when the application in the network device can handle the diagnostic packets, to the application for handling, receive response packets from the application, and transmit the response packets.

According to some embodiments, an information handling system includes an application and a layer 3 handler, and a subnet coupled to the network device by a first network link. The layer 3 handler is configured to receive packets via the first network link, determine whether the packets are diagnostic packets by examining bit patterns of the packets, determine, when the packets are the diagnostic packets, whether the application can handle the diagnostic packets, deliver the diagnostic packets, when the application can handle the diagnostic packets, to the application for handling, receive response packets from the application, and transmit the response packets.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a Personal Digital Assistant (PDA), a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
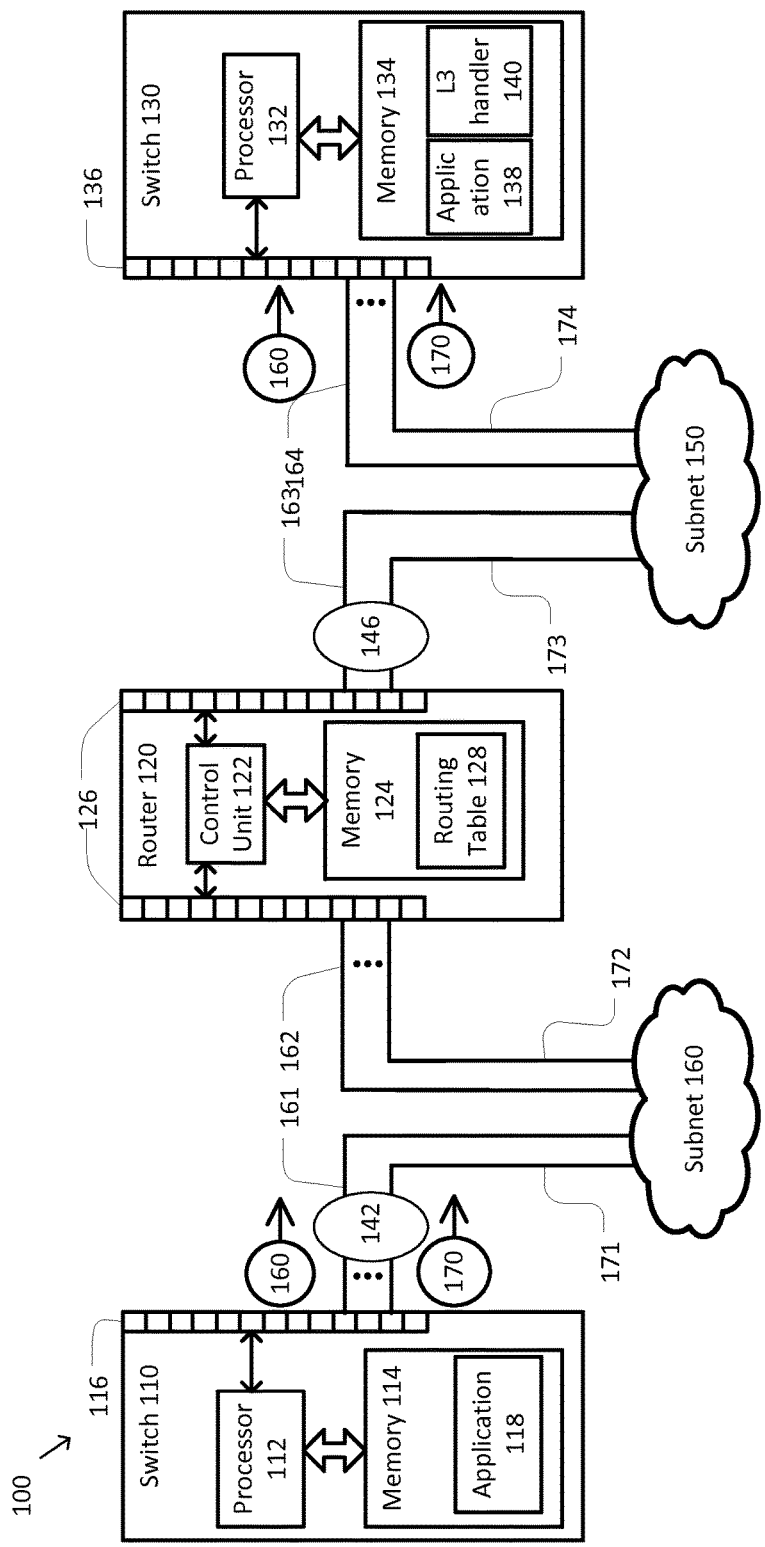
FIG. 1 is a simplified diagram of a network showing the flow of an application packet and a diagnostic packet according to some embodiments.

FIG. 1 is a simplified diagram of a network 100 showing the flow of an application packet 160 and a diagnostic packet 170 according to some embodiments. As shown in FIG. 1, network 100 includes a network device 110 coupled to a subnet 160 via one or more network links (e.g., network link 161 and network link 171) using one or more ports 116 that are included in network device 110. Although only two network links are shown between network device 110 and subnet 160, any suitable number of network links coupling a corresponding number of ports in network device 110 and subnet 160 are possible. In some embodiments, subnet 160 may include a local area network (LAN), such as an Ethernet LAN. In some embodiments, subnet 160 may include a wide area network (WAN), such as an internet. In some embodiments, the one or more network links may be configured as an inter-switch link (ISL) 142. Although only two network links are shown in ISL 142, any number of network links may be included in ISL 142 that couple together corresponding ports 116 of network device 110 to subnet 160. In some examples, ISL 142 may be a link aggregation group (LAG) 142. In some embodiments, network device 110 may be a network switching device, a switch, a router, a bridge, an end device, and/or the like. In some examples, the end device may be a server, a work station, a PC, a laptop, a tablet, a mobile device, and/or the like. Network device 110 may include one or more processors 112 and memory 114. The one or more processors 112 are coupled to memory 114, and the one or more ports 116 as shown in FIG. 1. In some embodiments, the one or more processor 112 may be configured to manage and/or control the operation of network device 110. In some examples, the one or more processors 112 may be any type of central processing unit, microprocessor, microcontroller, multi-core processor, field programmable gate array (FPGA), application specific integrated circuit (ASIC), and/or the like. In some examples, the one or more processors 112 may be a virtual processor of a virtual machine and/or a virtual environment.

Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Memory 114 may be used to store various software components that may be executed by the one or more processors 112. Memory 114 may further store variables and/or data structures being manipulated by the software components. As shown in FIG. 1, memory 114 includes an application 118.

As shown in FIG. 1, network 100 may include a router 120 configured to route data packets being transmitted between one network device (e.g. network device 110) and another network device (e.g. network device 130) in network 100. In some embodiments, router 120 includes one or more ports 126 configured to couple router 120 to other network devices, such as switches, routers, bridges, end devices, and/or networks, e.g., subnet 160 and subnet 150. Router 120 may include a control unit 122 configured to manage and/or control the operation of router 120. Control unit 122 may use one or more protocols to communicate with other network devices such as switches, routers, bridges, end devices, and networks using the ports 126 and network links. In some embodiments, control unit 122 may include one or more processors. Router 120 also includes a memory 124 coupled to control unit 122. Memory 124 may include one or more routing tables 128. Routing tables 128 may include forwarding and/or routing information used by router 120 to forward network traffic using the one or more ports 126. In some examples, routing tables 128 may include virtual LAN (VLAN) tables, media access control (MAC) tables, layer 3 (L3) tables, L3 forwarding information bases (FIB), access control lists (ACLs), flow processing (FP) tables, hash tables and/or the like.

In some embodiments, router 120 is coupled to subnet 160 and subnet 150 using one or more network links, such as link 162, link 172, link 163 and/or link 173. Although only two network links are shown between router 126 and subnet 160, any suitable number of network links coupling a corresponding number of ports 126 in router 120 with subnet 160 is possible. Similarly, any suitable number of network links coupling a corresponding number of ports 126 in router 120 with subnet 150 is possible. In some examples, the one or more network links, e.g., link 163 and link 173 may be configured as an inter-switch link (ISL) 146. Although only two network links are shown in ISL 146, any number of network links may be included in ISL 146 that couple together corresponding ports 126 of router 120 to the subnet 150. In some examples, ISL 146 may be a link aggregation group (LAG) 146. Subnet 160 and/or subnet 150 may each include one or more network devices, or one or more network switching devices (not shown) for forwarding or routing the network traffic between network device 110 and router 120, and router 120 and network device 130, respectively.

Still referring to FIG. 1, network 100 may also include a network device 130 that is substantially similar to network device 110. Network device 130 includes one or more ports 136, and is coupled to a subnet 150 via one or more network links (e.g., link 164 and link 174) using the one or more ports 136. Although only two network links are shown between network device 130 and subnet 150, any suitable number of network links coupling a corresponding number of ports in network device 130 and subnet 150 are possible. Subnet 150 may include LAN and/or a WAN. The one or more network links may or may not be configured as a LAG (not shown). In some embodiments, network device 130 may be a network switching device, a switch, a router, a bridge, an end device, and/or the like. In some examples, the end device may be a server, a work station, a PC, a laptop, a tablet, a mobile device, and/or the like. Network device 130 may include one or more processors 132 and a memory 134. The one or more processors 132 are coupled to memory 134, and the one or more ports 136 as shown in FIG. 1. In some embodiments, the one or more processors 132 may be configured to manage and/or control the operation of network device 130. In some examples, the one or more processors 132 may be any type of central processing unit, microprocessor, microcontroller, multi-core processor, field programmable gate array (FPGA), application specific integrated circuit (ASIC), and/or the like. In some examples, the one or more processors 132 may be a virtual processor of a virtual machine and/or a virtual environment. Memory 134 may include one or more types of machine readable media. Memory 134 may include an application 138 and a layer 3 handler 140. In some embodiments, application 138 and layer 3 handler 140 are executed by the one or more processors 132. In some embodiments, although layer 3 handler 140 shown in FIG. 1 is included in memory 134, layer 3 handler 140 may be implemented within any suitable hardware or a combination of hardware and software.

Figure 2:
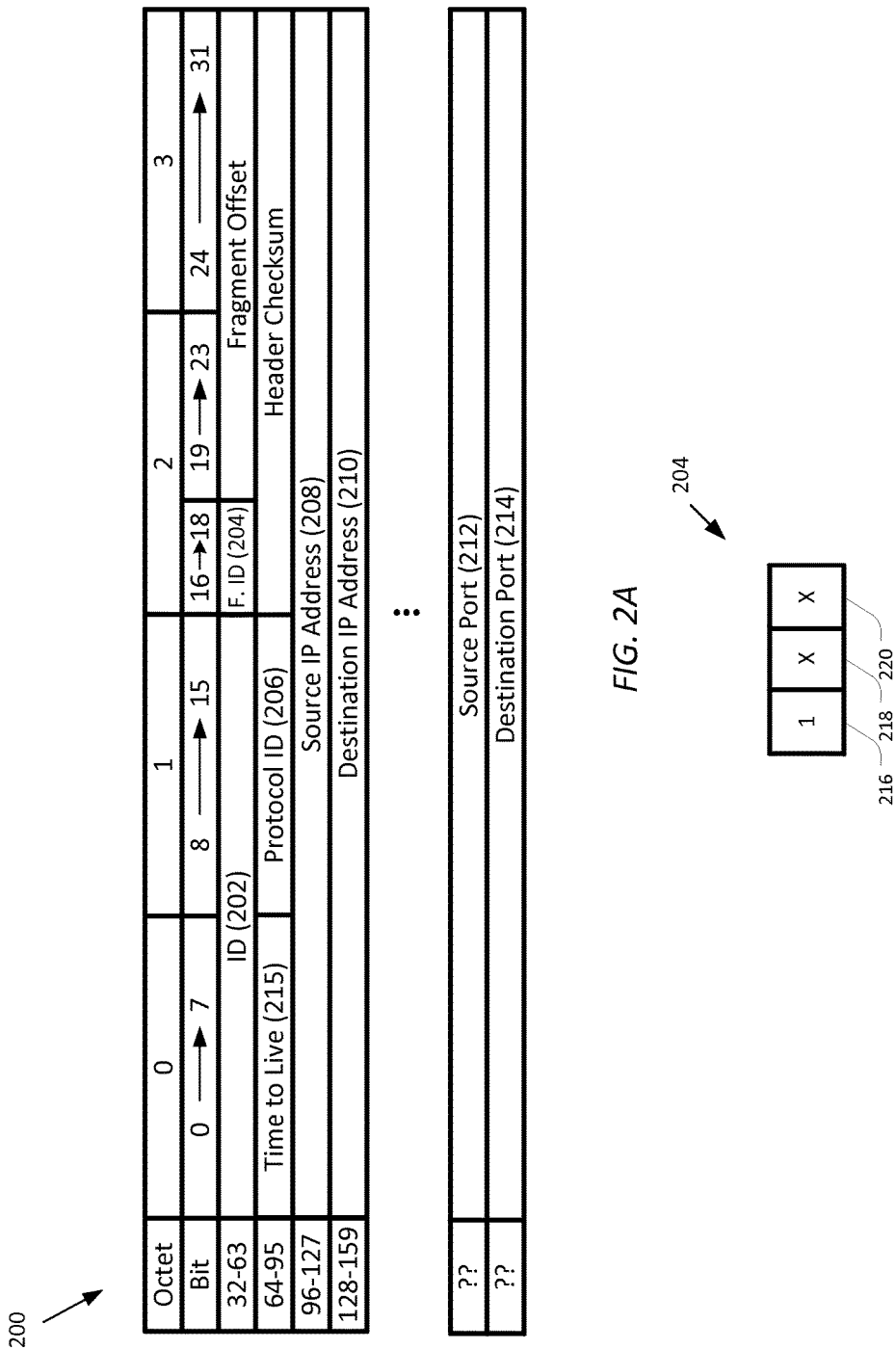
FIG. 2A is a simplified diagram showing an IP header in a network packet according to some embodiments.
FIG. 2B is a simplified diagram of using one or more bit patterns of the IPv4 IP header of FIG. 2A to designate a diagnostic packet according to some embodiments.

FIG. 2A is a simplified diagram showing an IP header 200 in a network packet according to some embodiments. IP header 200 may include one or more fields, such as source IP address 208, destination IP address 210, protocol ID 206, source port 212, and destination port 214. In some embodiments, the packet may include other information stored in a payload (not shown). When network device 110 sends an application packet 160 to be delivered to network device 130 via router 120, subnet 160, and subnet 150, a route selection hashing mechanism may be used to choose from the one or more ports 116 and corresponding network links (e.g., network links 161 and 171) on which to forward/route the application packet 160 to the next switch in the network. In some embodiments, the one or more ports and corresponding network links of the route selection hashing may be determined by control unit 122 of router 120 by checking one or more fields included in application packet 160. The one or more fields may include source IP address 208 (e.g., IP address of network device 110), destination IP address 210 (e.g., IP address of network device 130), protocol ID 206 (e.g., transmission control protocol (TCP) or user datagram protocol (UDP)), source port 212 (e.g., socket associated with sending packet 160 by application 118 of network device 110), and destination port 214 (e.g., socket associated with receiving packet 160 at application 138 of network device 130). A hash table including recently used routes may be used as references to determine the route by which to send a packet with certain one or more fields. For example, when more than one network packet has the same IP header information, such as source IP address 208, destination IP address 210, protocol ID 206, source port 212, and destination port 214, each network packet may be forwarded/routed using the same physical link(s) between the source and destination switches.

Based on the route selection information stored in the hash table, packet 160 with destination IP address 210, protocol ID 206, source port 212, and destination port 214, the route selection hashing mechanism of ISL 142 may be hashed to one of the network links (e.g., network link 161) from application 118 of network device 110 to subnet 160. Packet 160 may then be routed from one or more network devices of subnet 160 to router 120.

In some examples, when router 120 receives packet 160, it may be passed to control unit 122 for processing. In some examples, when control unit 122 receives packet 160, it may determine the next hop in the routing path by comparing the destination IP address in packet 160 and the stored information in routing tables 128. Routing tables 128 may be arranged as next hop tables. In some examples, the MAC table of routing tables 128 may map destination MAC addresses to a port or an ISL that designates the next hop in the path for packet 160. In some examples, the L3 FIB or routing tables 128 may similarly map destination IP addresses to a port or an ISL that designates the next hop in the path for packet 160. In some examples, the L2 MAC table and/or L3 FIB may include hundreds or even thousands of next hop entries using a particular port or an ISL.

In some examples, packet 160 may then be forwarded to subnet 150 using one of the network links (e.g., link 163) as further selected by the hashing mechanism of ISL 146. Packet 160 may then be routed to network device 130 through subnet 150. When packet 160 is delivered to network device 130, packet 160 may be examined by layer 3 handler 140 to check IP header information. Based on the destination port information stored in packet 160 and/or protocol ID 206, packet 160 may then be forwarded to application 138 for further processing.

In some embodiments, in order to monitor the link status that is used to deliver application packet 160, and to check the application at the end network device (e.g., application 138 at network device 130) to see if the application is alive, a diagnostic packet 170 having the same header information as application packet 160 may be used to diagnose the status of the intervening network links and the application 138 at the end network device.

When diagnostic packet 170 carries different IP header information, such as protocol ID 206, source port 212, or destination port 214 from those of application packet 160, layer 3 handler 140 of network device 130 is able to distinguish diagnostic packet 170 from application packet 160 so that network device 130 can separately deliver diagnostic packet 170 for diagnostic purposes and application packet 160 to application 138. However, in this case, diagnostic packet 170 may not generally take the same path through network 100 as application packet 160. This is because of the different IP header information in diagnostic packet 170 and application packet 160. In some examples, the route selection hashing mechanism of ISL 142 may select one or more of the network links (e.g., network link 171) for diagnostic packet 170 that is different from the one or more network links (e.g., network link 161) used for application packet 160 because diagnostic packet 170 and application packet 160 include different information in the IP header fields that are typically used by the handing mechanism of ISL 142. Subnet 160 may further pass diagnostic packet 170 to router 120. Router 120 may route diagnostic packet 170 using one or more of the network links (e.g., network 173) to subnet 150 and again the hashing mechanism of ISL 146 may select different network links for diagnostic packet 170 (e.g., network link 173) and application packet 160 (e.g., network link 163). Diagnostic packet 170 may then be routed to network device 130. In some examples, subnet 160 and/or subnet 150 includes one or more network devices (not shown), and the one or more network devices may forward/route application packet 160 and diagnostic packet 170 on different network links, as discussed with respect to network device 110 and ISL 142, and router 120 and ISL 146.

When packet 170 is forwarded to layer 3 handler 140 of network device 130, because the destination port 214 and/or protocol ID 206 of diagnostic packet 170 is different from the destination port and/or the protocol ID of packet 160, diagnostic packet 170 may be delivered to a diagnostic handler, such as an Internet Control Message Protocol (ICMP) handler, in network device 130 and application packet 160 may be delivered to application 138. Consequently, it is not possible to reliably check if the path used to deliver application packet 160 using diagnostic packet 170 because of the differing IP header information.

As an alternative, the route taken by diagnostic packet 170 may be more likely to match the route taken by application packet 160 when diagnostic packet 170 and application packet 160 have the same fields, i.e. protocol ID 206, source IP address 208, destination IP address 210, source port 212, and destination port 214 as shown in FIG. 2A as application packet 160. However, when diagnostic packet 170 arrives at end network device 130, layer 3 handler 140 may not be able to distinguish between application packet 160 and diagnostic packet 170, therefore application 138 may mistake diagnostic packet 170 as a regular packet for further processing at end network device 130. This could take up extra bandwidth and waste time at end network device 130, and even create unnecessary failure notification message(s) when application 138 cannot properly interpret diagnostic packet 170 after stripping off the IP header information.

FIG. 2B is a simplified diagram using one or more bit patterns of the IP header of a network packet to designate a diagnostic packet according to some embodiments. In some embodiments, the bit patterns includes one or more fields of IPv4 IP header 200, e.g., a fragment ID field 204 as shown in FIG. 2B, to designate a diagnostic packet. Fragment ID field 204 includes one or more bits as shown in FIG. 2B. In some embodiments, fragment ID field 204 includes a bit 216 corresponding to a reserved bit 216. In some examples, reserved bit 216 is typically found at the 48$^{th}$ bit of IPv4 header 200. Reserved bit 216 is normally unused, i.e., reserved bit 216 is set to zero, for an application packet, such as application packet 160. Fragment ID field 204 may also include a bit 218 corresponding to "Don't Fragment (DF)", and a bit 220 corresponding to "More Fragments (MF)". In some examples, when DF field 218 of a packet is set to one, fragmentation is required to route the packet. For unfragmented packets, the MF field 220 is cleared. For fragmented packets, all fragments except the last fragment have the MF flag set. Although fragment ID field 204 is used to designate a diagnostic packet as shown in FIG. 2B, it is to be understood that any other suitable bit patterns, such as other fields and/or other bits, may be used to designate a diagnostic packet. In some embodiments, the bit patterns may be included in an IPv6 extension header.

In order to make diagnostic packet 170 distinctive from application packet 160, while improving the likelihood that diagnostic packet 170 is hashed to the same route as that of application packet 160 from source network device 110 to end network device 130, the related bit patterns (e.g., fragment ID field 204) may be used to mark IPv4 header 200 of diagnostic packet 170. As exemplarily shown in FIG. 2B, reserved bit 216 of diagnostic packet 170 may be set to one instead of zero, whereas reserved bit 216 in application packet 160 is zero. In some examples, when DF field 218 is one and MF field 220 is zero, application packet 160 can be interpreted as a packet that has not been fragmented and for which further fragmentation is inhibited. In some examples for diagnostic packet 170, reserved bit 216 may be set to one, DF field 218 may be one or zero, and MF field 220 may be one or zero. Except for the marked fragment ID field 204 as shown in FIG. 2B, the fields used for packet routing/forwarding, i.e. protocol ID 206, source IP address 208, destination IP address 210, source port 212, and destination port 214 are the same for diagnostic packet 170 and application packet 160.

Figure 3:
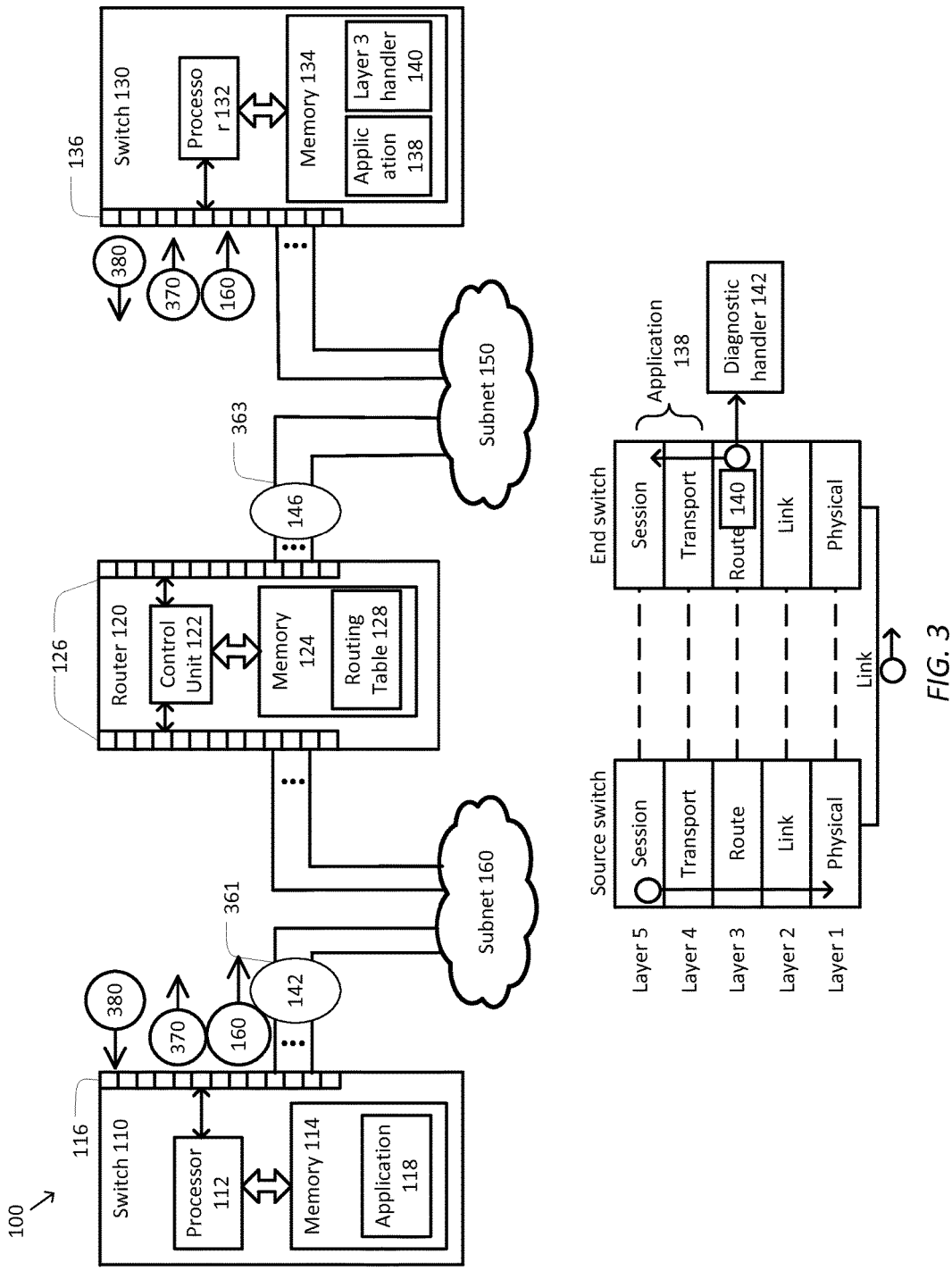
FIG. 3 is a simplified diagram of a network showing the flow of an application packet and a diagnostic packet including a marked fragment ID field as shown in FIG. 2 according to some embodiments.

FIG. 3 is a simplified diagram of network 100 showing the flow of an application packet 160 and a diagnostic packet 370 including bit patterns as shown in FIGS. 2A-2B according to some embodiments. Because the fields used for packet routing/forwarding as shown in FIG. 2A, i.e., protocol ID 206, source IP address 208, destination IP address 210, source port 212, and destination port 214 are the same in diagnostic packet 370 as they are in application packet 160, each of the switches and/or routers in network 100 that forward/route application packet 160 and the diagnostic packet 370 may use the same path to deliver diagnostic packet 370 and application packet 160 from network device 110 to network device 130. For example, when sending diagnostic packet 370 and application packet 160 from network device 110 to network device 130 as shown in FIG. 3, the route selection hashing mechanism of ISL 142 may select the same one or more network links (e.g., link 361) to forward diagnostic packet 370 and application packet 160 from network device 110 to subnet 160. The one or more network devices in subnet 160 may further forward/route diagnostic packet 370 and application packet 160 to router 120 via the same one or more of the network links between the one or more network devices in subnet 160 and router 120. Diagnostic packet 370 and application packet 160 may then be routed from router 120 to subnet 150 using the same one or more of the network links (e.g., link 363). The one or more network devices in subnet 150 may then forward/route diagnostic packet 370 and the application packet 160 to network device 130 via the same one or more of the network links between the one or more network devices in subnet 150 and network device 130.

When application packet 160 and diagnostic packet 370 are transmitted between network device 110 and network device 130, the fields, i.e. protocol ID 206, source IP address 208, and destination IP address 210 may be used to forward/route the packets from the start network device 110 to the end network device 130. The bit patterns, e.g., fragment ID field 204, is not generally used for hashing during the transmission between network device 110 and network device 130. When application packet 160 and diagnostic packet 370 are handled by layer 3 handler 140 of network device 130, it is determined whether application 138 of network device 130 is capable of handling the packets. If application 138 is capable of handling the packets, based on the identical destination port and the identical protocol ID information, application packet 160 and diagnostic packet 370 may be delivered to layer 4 protocol and then to layer 5 application using protocol ID 206 and/or destination port 214.

In some embodiments, when a network packet (e.g., application packet 160 and/or diagnostic packet 370) arrives at network device 130, it is generally processed by layer 3 handler 140. Layer 3 handler 140 examines one or more fields of the IP header, such as destination port 214 field of the IP header information 200, and then delivers the network packet to a socket associated with destination port 214. To distinguish between application packet 160 and diagnostic packet 370, layer 3 handler 140 of the end network device 130 may examine the bit patterns of the received network packet (e.g., fragment ID field 204) as part of its layer 3 processing. When the bit patterns show that the received network packet is a diagnostic packet, for example, when reserved bit 216 of fragment ID field 204 for the packet appears to be one, and DF bit 218 and MF bit 220 are one and zero respectively, the packet is recognized to be diagnostic packet 370. Layer 3 handler 140 of end network device 130 may then determine whether application 138 at layer 4 of network device 130 can handle the diagnostic packet. When application 138 can handle diagnostic packet 370, diagnostic packet 370 is delivered to application 138 for handling. A response packet 380 may then be formed to be forwarded/routed back to network device 110. In some examples, in response packet 380, one or more bits of ID field 202, and one or more bits in payload field (not shown) may be used for storing the diagnostic results to be sent from application 138 of network device 130 to application 118 of network device 110. The diagnostic results include, for example, the network status and/or the working status of the application 138 at network device 130. When application 138 cannot handle diagnostic packet 370, diagnostic packet 370 is handled by a diagnostic handler 142, such as an ICMP handler, at layer 3 of end network device 130, and a suitable response may be generated.

As discussed above and further emphasized here, FIGS. 1 and 3 are merely examples, which should not unduly limit the scope of the application. One of ordinary skill in the art would recognize many variations, alternatives, and modifications. In some embodiments, network 100 may include more than one intermediate router. In some embodiments, fewer or more network links than what are shown in FIGS. 1 and 3 may exist between any of network device 110, subnet 160, router 120, subnet 150, and/or network device 130.

Figure 4:
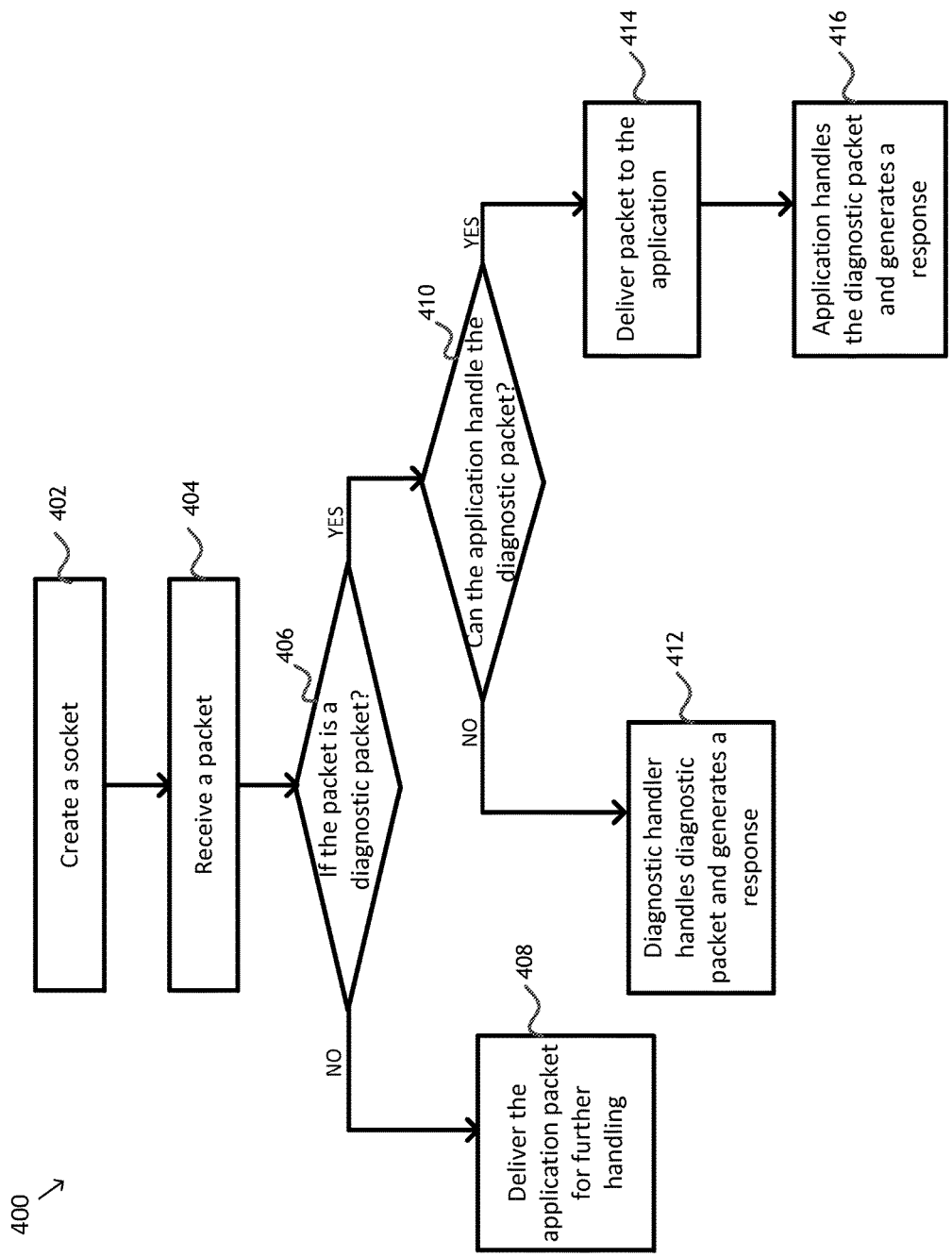
FIG. 4 is a flowchart showing a method of handling a marked diagnostic packet at an end network device according to some embodiments.

FIG. 4 is a flowchart showing a method 400 of handling marked diagnostic packet 370 at end network device 130 of network 100 of FIG. 3 according to some embodiments. As shown in FIG. 4, method 400 includes a process 402 for creating a socket, a process 404 for receiving a packet, and a process 406 for determining if the packet is a diagnostic packet. When the packet is determined to be a normal application packet (e.g. application packet 160) instead of a diagnostic packet (e.g., diagnostic packet 370), method 400 proceeds to a process 408 for delivering the application packet to application 138 of end network device 130 for further handling. When the packet is determined to be a diagnostic packet (e.g., diagnostic packet 370), method 400 proceeds to a process 410 for determining if the diagnostic packet can be handled by application 138 of network device 130. When application 138 cannot handle the diagnostic packet, method 400 proceeds to a process 412 for handling the diagnostic packet by a diagnostic handler at layer 3 of network device 130. When application 138 can handle the diagnostic packet, the diagnostic packet is delivered to application 138 by a process 414. Method 400 further proceeds to a process 416 where application 138 handles the diagnostic packet and generates a response packet. According to certain embodiments, method 400 can be performed using variations among processes 402-416 as would be recognized by one of ordinary skill in the art. In some embodiments, one or more of the processes 402-416 of method 400 may be implemented, at least in part, in the form of executable code stored on non-transient, tangible, machine readable media that when run by one or more processors (e.g., one or more processors 112 in the network device 110, processors 132 in the network device 130, processors 122 in router 120, one or more network devices in subnet 160, and one or more network devices in subnet 150) may cause the one or more processors to perform one or more of the processes 402-416.

At process 402, a socket may be created by application 138 to receive a network packet (e.g., application packet 160 and/or diagnostic packet 370). Application packet 160 includes IP header information, such as source IP address 208, source port 212, destination IP address 210, and destination port number 214 as shown in FIG. 2A. In some embodiments, the socket may be created by application 138 of end network device 130 to receive application packet 160 to be handled at end network device 130. In some embodiments, when application 138 creates the socket, application 138 also sends a socket creation request associating application 138 with a destination port identifier. In some embodiments, the socket creation request may also be used to associate destination port 214 with the ability of application 138 to handle diagnostic packets, so that application 138 can indicate whether or not it can handle diagnostic packets for the respective destination port.

At process 404, a packet (e.g., application packet 160 and/or diagnostic packet 370) is received at the port (e.g., port 139 of FIG. 3) of end network device 130. When the packet is received at end network device 130, it is examined to determine whether it includes IP header information 200. When the packet includes IP header information 200, it is forwarded to layer 3 handler 140 for further processing.

At process 406, it is determined by layer 3 handler 140 whether the received packet is a diagnostic packet. In some embodiments, the bit patterns of the received packet are examined by layer 3 handler 140 to determine whether the received packet is a diagnostic packet. In some examples, fragment ID field 204 of the IP header information as shown in FIG. 2B may be examined by layer 3 handler 140 to determine if the received packet is a diagnostic packet. For example, the fragment ID field 204 of the received packet is examined to see if it is one. When the received packet is determined to be a normal application packet, e.g. application packet 160 of FIGS. 1 and 3, application packet 160 is further handled application 138 following process 408. When the received packet is a diagnostic packet, e.g., packet 370 of FIG. 3, it is further handled following process 410.

At process 408, when the received packet is determined to be a normal application packet, e.g., application packet 160, the normal application packet is delivered to application 138 for handling based on destination port 214 of application packet 160.

At process 410, when the received packet is determined to be a diagnostic packet, it is determined by layer 3 handler 140 whether application 138 can handle the diagnostic packet. When application 138 at end network device 130 cannot handle diagnostic packet 370, method 400 proceeds to process 412 by delivering diagnostic packet 370 to diagnostic handler 142 at layer 3 of network device 130 for further handling, e.g., generating a response packet. When application 138 at end network device 130 is capable of handling diagnostic packet 370, method 400 proceeds to process 414 by delivering diagnostic packet 370 to application 138 for further handling.

Method 400 then proceeds to process 416 by handling the diagnostic packet by application 138, and generating a response packet (e.g., response packet 380) to be forwarded/routed back to start network device 110. In some embodiments, response packet 380 may include information reflecting the network status, for example, the response time and/or working status of each router (e.g., router 120) and each network device (e.g., network device 110, one or more network devices of subnet 160 and 150, and network device 130) of network 100 involved in routing and forwarding diagnostic packet 370. Such information may be reflected in Time to Live (TTL) field 215 of response packet 380 as shown in FIG. 2A. For example, TTL field 215 decreases by one after getting routed by a router (e.g., router 120) or forwarded by a network device (network device 110 and/or network device 130) once, therefore, by checking TTL field 215, the working status of the routers and/or switches in the network (e.g., network 100) may be examined. In some examples, when one router or switch does not function properly or is not capable of handling the received packet, diagnostic packet 370 may be send back to the starting network device (e.g., network device 110) as a response packet 380. After checking TTL field 215 of response packet 380, a malfunction of a router or packet may be identified by comparing the information in TTL field 215 and the number of routers and/or switches in the network. Moreover, the response packet 380 may also include information related to the working status of the end application, e.g., application 138 of end network device 130. In some examples, the information may be created by processor 132 of end network device 130 to be stored in the payload of response packet 380. Response packet 380 may be delivered back using the same path used to send diagnostic packet 370 from network device 110 to network device 130, but in a reverse direction.

In some embodiments when application 138 of network device 130 can handle diagnostic packet 370, application 138 may register with layer 3 handler 140 of network device 130 to indicate that application 138 is capable of handling diagnostic packet 370 with a certain destination port number 214 and/or protocol ID 206. In some embodiments, the layer 3 forwarding information of network device 130 is updated accordingly. For example, the information in the destination port number can be associated with the ability of application 138 to handle the diagnostic packet. In this case, the socket creation mechanisms of network device 130 remain the same without any updates needed.

Some embodiments of network device 110, network device 130, and/or router 120, may include non-transient, tangible, machine readable media that include executable code that when run by one or more processors (e.g., the one or more processors 112, 132, and/or 122) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, the figure of the network controller is merely an example, which should not unduly limit the scope of the claims. One of ordinary skill in the art would recognize many variations, alternatives, and modifications. According to some embodiments, other architectures are possible for the network controller.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of handling packets, the method comprising:
receiving, from a first network device, one or more non-diagnostic application packets and a first diagnostic packet at a layer 3 handler in a second network device, wherein the one or more non-diagnostic application packets and the first diagnostic packet utilize a same networking path;
delivering, by the layer 3 handler, the one or more non-diagnostic application packets to an application within the second network device;
determining, by the layer 3 handler, whether the first diagnostic packet is a diagnostic request packet by examining bit patterns of the first diagnostic packet;
determining, by the layer 3 handler, when the first diagnostic packet is a diagnostic request packet, whether the application can handle diagnostic request packets;
delivering, by the layer 3 handler, the first diagnostic packet to the application for handling in response to determining that the first diagnostic packet is a diagnostic request packet and that the application can handle diagnostic request packets;
receiving, by the layer 3 handler, one or more response packets from the application, the one or more response packets including information related to a working status of the application; and
returning, by the layer 3 handler, the one or more response packets to the first network device.

2. The method of claim 1, further comprising:
receiving a socket creation request from the application, the socket creation request associating the application with a destination port identifier;
wherein the socket creation request includes a designation that the application can handle diagnostic request packets.

3. The method of claim 1, wherein one or more non-diagnostic application packets and the first diagnostic packet include a same source IP address, a same destination IP address, a same source port, and a same destination port.

4. The method of claim 1, further comprising receiving a registration request from the application, the registration request indicating that the application can handle diagnostic request packets.

5. The method of claim 1, further comprising determining, by the layer 3 handler, that the one or more non-diagnostic application packets are non-diagnostic application packets by examining bit patterns of the one or more non-diagnostic application packets.

6. The method of claim 1, wherein examining the bit patterns includes examining one or more fields of an IP header.

7. The method of claim 1, wherein when the application cannot handle diagnostic request packets, further comprising delivering the first diagnostic packet to a layer 3 diagnostic handler of the second network device.

8. The method of claim 1, further comprising transmitting the response packets to a subnet.

9. A network device, comprising:
a memory storing an application and a layer 3 handler; and a processor coupled to the memory and configured to execute the application and the layer 3 handler;
wherein the layer 3 handler is configured to:
receive, from a second network device, one or more non-diagnostic application packets and a first diagnostic packet, wherein the one or more non-diagnostic application packets and the first diagnostic packet utilize a same networking path;
deliver the one or more non-diagnostic application packets to the application;
determine whether the first diagnostic packet is a diagnostic request packet by examining bit patterns of the first diagnostic packet;
determine, when the first diagnostic packet is a diagnostic request packet, whether the application can handle diagnostic request packets;
deliver the first diagnostic packet, when the application in the network device can handle diagnostic request packets, to the application for handling;
receive one or more response packets from the application, the one or more response packets including information related to a working status of the application; and
return the one or more response packets to the second network device.

10. The network device of claim 9, wherein the one or more non-diagnostic application packets and the first diagnostic packet include a same source IP address, a same destination IP address, a same source port, and a same destination port.

11. The network device of claim 9, wherein the network device is selected from the group consisting of a switch, a router, a bridge, and an end device.

12. The network device of claim 9, wherein:
the layer 3 handler is further configured to receive a socket creation request from the application, the socket creation request associating the application with a destination port identifier; and
the socket creation request includes a designation that the application can handle diagnostic request packets.

13. The network device of claim 9, wherein the layer 3 handler is further configured to receive a registration request from the application, the registration request indicating that the application can handle diagnostic request packets.

14. The network device of claim 9, wherein the layer 3 handler is further configured to determine that the one or more non-diagnostic application packets are non-diagnostic application packets by examining bit patterns of the one or more non-diagnostic application packets.

15. An information handling system, comprising:
a first network device including a memory, the memory storing an application and a layer 3 handler; and
a subnet coupled to the first network device by a first network link, wherein the layer 3 handler is configured to:
receive, from a second network device, one or more non-diagnostic application packets and a first diagnostic packet via the first network link, wherein the one or more non-diagnostic application packets and the first diagnostic packet utilize a same networking path;
deliver the one or more non-diagnostic application packets to the application;
determine whether the first diagnostic packet is a diagnostic request packet by examining bit patterns of the first diagnostic packet;
determine, when the first diagnostic packet is a diagnostic request packet, whether the application can handle diagnostic request packets;
deliver the first diagnostic packet to the application for handling in response to determining that the first diagnostic packet is a diagnostic request packet and that the application can handle diagnostic request packets;
receive one or more response packets from the application, the one or more response packets including information related to a working status of the application; and
return the one or more response packets to the second network device.

16. The information handling system of claim 15, wherein the bit patterns include a reserved bit of an IP header when the first diagnostic packet is a diagnostic request packet.

17. The information handling system of claim 15, wherein the one or more non-diagnostic application packets and the first diagnostic packet include a same source IP address, a same destination IP address, a same source port, and a same destination port.

18. The information handling system of claim 17, further comprising a router coupled to the subnet by a second network link, the router configured to hash the one or more non-diagnostic application packets and the first diagnostic packet via the second network link from the router to the subnet.

19. The information handling system of claim 15, wherein when the application in the first network device cannot handle diagnostic request packets, the layer 3 handler is further configured to deliver the first diagnostic packet to a layer 3 diagnostic handler of the first network device.

20. The information handling system of claim 15, wherein the layer 3 handler is further configured to transmit the response packets to the subnet.

* * * * *